United States Patent [19]
Vachey

[11] Patent Number: 5,630,120
[45] Date of Patent: *May 13, 1997

[54] METHOD TO HELP IN OPTIMIZING A QUERY FROM A RELATIONAL DATA BASE MANAGEMENT SYSTEM

[75] Inventor: Eric Vachey, Paris, France

[73] Assignee: Bull, S.A., Paris, France

[*] Notice: The term of this patent shall not extend beyond the expiration date of Pat. No. 5,495,605.

[21] Appl. No.: 525,072

[22] Filed: Sep. 8, 1995

Related U.S. Application Data

[63] Continuation of Ser. No. 128,159, Sep. 29, 1993, abandoned.

[30] Foreign Application Priority Data

Oct. 12, 1992 [FR] France .................... 92 12148

[51] Int. Cl.$^6$ ................ G06F 9/00; G06F 15/00
[52] U.S. Cl. ............ 395/602; 395/603; 395/604; 395/605; 395/356; 395/348; 395/340; 364/DIG. 1; 364/282.1; 364/280.5; 364/286.3
[58] Field of Search ................ 395/602, 603, 395/604, 605, 356, 340, 348; 364/DIG. 1

[56] References Cited

U.S. PATENT DOCUMENTS

| | | | |
|---|---|---|---|
| 4,769,772 | 9/1988 | Dwyer | 395/600 |
| 4,774,661 | 9/1988 | Kumpati | 364/300 |
| 4,829,427 | 5/1989 | Green | 364/300 |
| 4,930,071 | 5/1990 | Tou et al. | 364/300 |
| 5,065,347 | 11/1991 | Pajak et al. | 395/159 |
| 5,091,852 | 2/1992 | Tsuchida et al. | 395/600 |
| 5,201,046 | 4/1993 | Goldberg et al. | 395/600 |
| 5,331,554 | 7/1994 | Graham | 364/419.07 |
| 5,335,345 | 8/1994 | Frieder et al. | 395/600 |
| 5,379,419 | 1/1995 | Heffernan et al. | 395/600 |
| 5,495,605 | 2/1996 | Cadot | 395/600 |

OTHER PUBLICATIONS

5th Int'l Conference on Data Engineering Feb. 10, 1989, pp. 590–597 "Extending a DBMS for geographic applications." Chin Ooi et al.

*Primary Examiner*—Thomas G. Black
*Assistant Examiner*—Jean R. Homere
*Attorney, Agent, or Firm*—Kerkam, Stowell, Kondracki & Clarke, P.C.; Edward J. Kondracki

[57] ABSTRACT

A method for assisting in optimization of a query from a relational data base management system is provided. The method includes constructing a tree on the basis of the search for the execution plan of the query written in the query language of the RDBMS, that is representative of the execution plan of the query, and representing the tree on a screen.

22 Claims, 8 Drawing Sheets

| OPERATION | OPTIONS | OBJECT_OWNER | OBJECT_NAME | ID | PARE | POSI |
|---|---|---|---|---|---|---|
| NESTED LOOPS | | | | 1 | | 0 |
| NESTED LOOPS | | | | 2 | 1 | 1 |
| NESTED LOOPS | | | | 3 | 2 | 1 |
| NESTED LOOPS | | | | 4 | 3 | 1 |
| TABLE ACCESS | FULL | SYS | OBJ$ | 5 | 4 | 1 |
| TABLE ACCESS | CLUSTER | SYS | CLU$ | 6 | 4 | 2 |
| INDEX | UNIQUE SCAN | SYS | I_OBJ* | 7 | 6 | 1 |
| TABLE ACCESS | CLUSTER | SYS | SEG$ | 8 | 3 | 2 |
| INDEX | UNIQUE SCAN | SYS | I_FILE#_BLOCK# | 9 | 8 | 1 |
| TABLE ACCESS | CLUSTER | SYS | TS$ | 10 | 2 | 2 |
| INDEX | UNIQUE SCAN | SYS | I_TS* | 11 | 10 | 1 |

| OPERATION | OPTIONS | OBJECT_OWNER | OBJECT_NAME | ID | PARE | POSI |
|---|---|---|---|---|---|---|
| TABLE ACCESS | CLUSTER | SYS | USER$ | 12 | 1 | 2 |
| INDEX | UNIQUE SCAN | SYS | I_USER* | 13 | 12 | 1 |

13 rows selected.

```
View: SYS.DBA_CLUSTERS select u.name, o.name, ts.name,
c.pctfree$, c.pctused$, c.size$, c.initrans, c.maxtrans,
s.iniexts * ts.blocksize, s.extsize * ts.blocksize,
s.minexts, s.maxexts, s.extpct
from sys.user$ u, sys.ts$ ts, sys.seg$ s, sys.clu$ c, sys.obj$ o
where o.owner* = u.user*
and o.obj* = c.obj*
and c.ts* = ts.ts*
and c.ts* = s.ts*
and c.file* = s.file*
and c.block* = s.block*
```

FIG. 2C

METHOD TO HELP IN OPTIMIZING A QUERY FROM A RELATIONAL DATA BASE MANAGEMENT SYSTEM

This is a continuation of application Ser. No. 08/128,159, filed Sep. 29, 1993, now abandoned.

RELATED APPLICATION

The subject matter of this application is related to the copending application of Michel CADOT, Ser. No. 08/128, 222 (BULL 3387), filed concurrently herewith, entitled "Method To Help In Optimizing A Query From A Relational Data Base Management System, And Resultant Method Of Syntactical Analysis", corresponding to French Application 92 12149, filed Oct. 12, 1992, now U.S. Pat. No. 5,495,605. The subject matter of said U.S application is hereby incorporated by reference.

FIELD OF THE INVENTION

The invention relates to a method to help in optimizing a query from a relational data base management system, more currently known by its acronym RDBMS. More particularly, it applies to the administration of the RDBMS.

BACKGROUND OF THE INVENTION

A data base may be defined as an integrated set of data that model a given universe. The data used by various applications are grouped in the same base in such a way as to avoid the problems of data duplication. Associated with a data base is a conceptual schema that describes the structure and type of the data that it contains and the constraints, which must always be verified. The data base administrator has the task of making sure of the verification of these constraints.

The data administration has three roles. First, it defines the data base users by assigning them a name, a password, and a set of privileges or rights for access to the data. It also defines the administrator or administrators, who are the persons authorized to handle all or part of the administration of the data base. The second role of the administration is to assign to the administrator, or cause him to participate in, the definition of the conceptual schema of the data base. The administrator thus defines the schemas of the various tables and the rules relating to these tables. In his final role, the administrator has possibility of benefiting, in terms of performance, integrity and security, from the conceptual schema of the base and of the RDBMS. It is this third role upon which the subject of the present invention essentially bears.

When an RDBMS application is being developed, the role of an administrator is to optimize the use of the RDBMS's resources. When a query is made at the time of the application, the RDBMS chooses an access route for executing the query. To optimize the performance of the application, the administrator must analyze the queries sent and decide on the action to be taken. His action may be to change the form of the query, and/or to create or delete indexes in the tables concerned. His decision depends on the information that indicates to him whether or not the current form of the query is adequate, or whether the existing indexes are pertinent.

The indexes are physically independent of the data and may thus be deleted and created at any moment. An index is used at the time of access to the data, regardless of who created it. A table may have several indexes at the same time. A compromise must be made between the number of indexes and the overhead involved in updating them. An index may apply to more than one column, and in that case it can assure the uniqueness of the columns used. It also improves the performance of the queries for which the selection condition will affect more than one column. A query with more than one predicate can use multiple indexes, if they are unique, if the predicates are equalities and are defined in the same table. In that case, the partial results from each index are merged to constitute the definitive result. Some RDBMSs are capable of using the properties of indexes and the characteristics of columns to decide which index to take and which to avoid for the merge operation. Whether or not to use an index is decided by the RDBMS optimizer. The decision varies depending on the type of RDBMS.

On the other hand, the schema of an RDBMS may evolve dynamically. For example, one or more fields may be added to a table, and indexes may be created in a table. In this context, it may happen that the RDBMS does not encounter an index that it must use, or encounters an index that it must not use, for example if access is being gained to more than 10% of the articles. In this latter case, the index becomes a hindrance. Given all the possibilities in choice of the RDBMS to set up its plan, it is estimated that the utilization of the resources can vary within a ratio of 1:10,000, depending on the formula of the query and the choice of indexes.

At present, optimizing a query is complicated. First, it is not automatic, and specific RDBMS tools must be used to request the plan of execution of the query. This plan is the concatenation of operations to be executed by the data base server in order to process the query. To request this plan, the user must write the query in the language of the RDBMS. Hence, writing the query requires good knowledge of the query language of the RDBMS. Moreover, it is rigorous and arduous work and involves a great loss of time, aggravated by the risks of mistakes that ensue. In response, the RDBMS furnishes the results of the request of the execution plan of the query, in a variable form depending on the RDBMS. The plan is written in the query language of the RDBMS and is currently present in the form of a long table with multiple columns, for example. The table is written in linear mode and appears on the screen only one page at a time. Analyzing the table is accordingly highly complicated, and the user ordinarily makes his task easier by requesting a printout of the table on paper. This means that he must go through all the printing processes specific to that terminal. The printout is done page by page, with column headings repeated each page. Consequently, in the coded language, the administrator must decrypt the hierarchy of processing the query and reconstitute the plan by analyzing numerous columns and a large number of disordered lines on various pages. This makes the search long and difficult. Moreover, the administrator does not have a global view of the plan available, which would ordinarily be too long to obtain and would be overly bothersome in proportion to the advantage he would gain from it. Nevertheless, the administrator must overcome this disadvantage as well as he can, in order to decide how to optimize the query. For example, if he modifies the query, he must rewrite the modified query, analyze the new table, and compare it with the old table. The tools used to create an analysis table do not save the preceding table in memory, and hence it must be printed out in order to be able to refer to it to make the comparison with the new table. In practice, the comparison accordingly consists of gathering the long, difficult analyses of the two tables. Finally, the administrator lacks a visual display of information about the objects used in the processing. It will be appreciated that under these conditions, optimizing a query is difficult to achieve rapidly, even for a skilled administrator.

SUMMARY OF THE INVENTION

The object of the invention is to make the visual display and interpretation of the plan of execution of a query easier, so that the processing of the query can be optimized rapidly, at less cost. Preferably, another object of the invention is to furnish additional information about the objects of the query. Another optional object of the invention is to simply and rapidly help a user, even a nonspecialist in the RDBMS query language, achieve better optimization of the execution of the query.

The subject of the invention is a method to help in optimizing a query of an RDBMS, including the search for the plan of execution of the query written in the query language of the RDBMS, characterized in that it consists of constructing a tree, on the basis of this search, that represents the plan of execution of the query, and representing the tree on a screen.

This process has the dual advantage of offering graphical representation of the execution plan of the query and of being independent of the optimizer and of the RDBMS query language. In a preferred variant embodiment of this method, this optimizing help may also be provided to any user who does not know the query language of the RDBMS.

BRIEF DESCRIPTION OF PREFERRED EMBODIMENTS

The characteristics and advantages of the invention will become apparent from the ensuing description, given by way of example and illustrated in the accompanying drawings.

In the drawings:

FIG. 1, taking the prior art as an example, illustrates a representative table of the execution plan written in the query language of an RDBMS and relating to the query shown in FIG. 2C;

FIGS. 2A, 2B and 2C illustrate log-on screens obtained from a tool according to the invention that employs the method of the invention;

DETAILED DESCRIPTION OF PREFERRED EMBODIMENTS

Figure 2A:
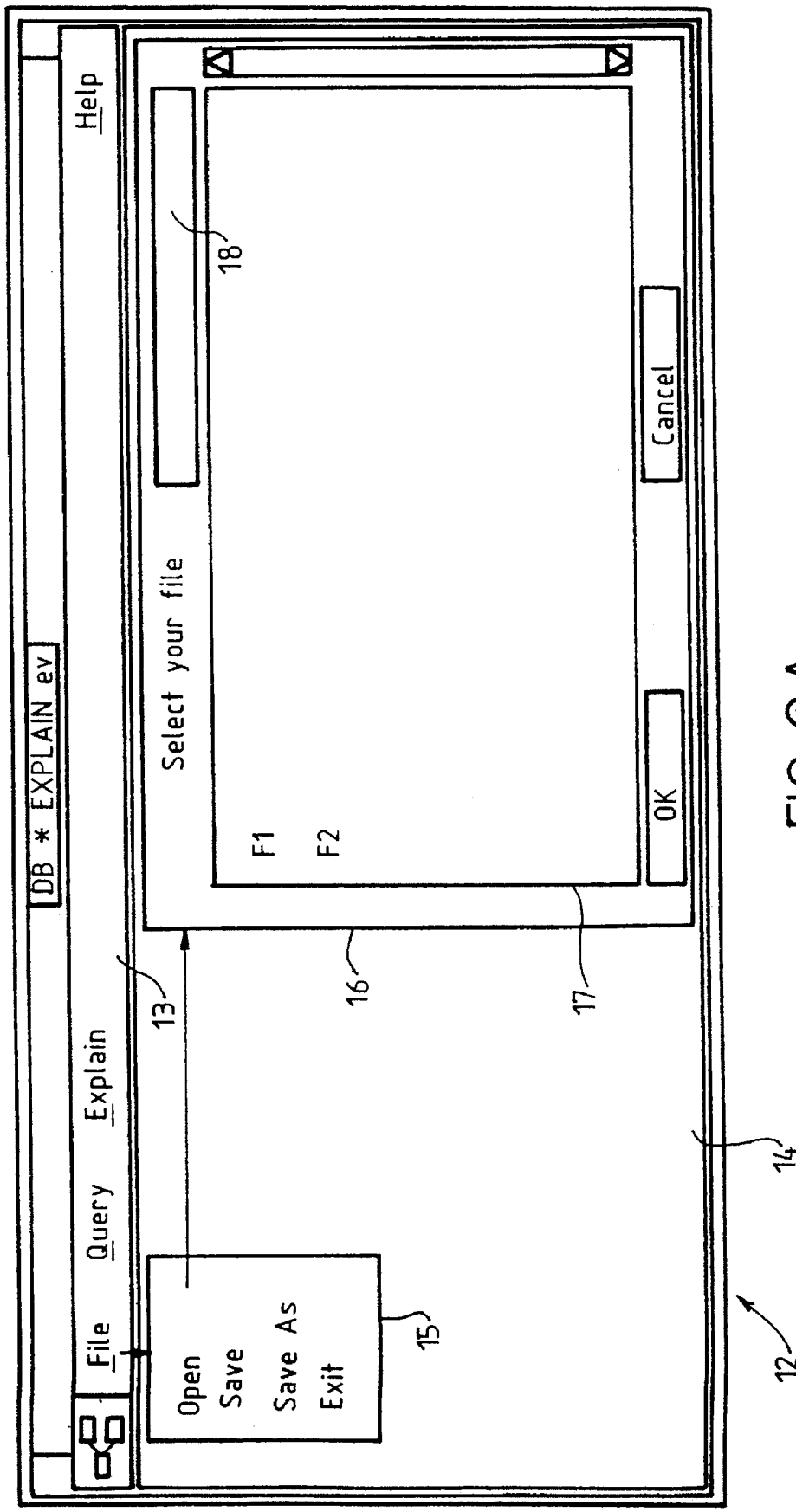

For the sake of clarity and simplicity, the description will pertain to a non-limiting example of RDBMS known by the registered trademark Oracle V6, produced by the Oracle Corporation and using the standard-sized language SQL (Structured Query Language) and running on a Unix station, the latter being a trademark registered by American Telephone and Telegraph. The example shown will relate to queries of the SELECT type in this RDBMS, it being understood that this example is limiting neither to this type in this RDBMS nor to other RDBMSs.

The functional architecture of Oracle is organized in four concentric layers, which in order, beginning at the center, are the core, the dictionary, the SQL layer, and the outer layer. The first three layers are called fundamental layers.

The core communicates with the data base and can connect with other cores in a distributed data base environment. One of its essential functions is the optimal execution of queries, thanks to an integrated SQL query optimizer.

The data dictionary is a metabase. It is made up of a set of tables and views that are manipulated with the aid of the SQL language. Its contents reflect an image of the base at any moment and thus provides a dynamic description of the data base. In particular, it makes it possible to describe the objects of the base (tables, columns, views, indexes, etc.) and the privileges and rights of the users with respect to the various objects. The dictionary is used for the administration of the data base if the user has an administration privilege. A user is considered to be an administrator if he has the DBA privilege. When the system is installed, two users are considered as administrators: SYS and SYSTEM. Only the SYS administrator has access to the data dictionary tables.

The SQL layer is the last fundamental layer of Oracle. It plays the role of an interface between the core and the tools of the outer layer. Hence any operation of access to the data is expressed in SQL language.

Finally, the outer layer is composed of tools that facilitate the development of applications and the use of all the functions offered by the three fundamental layers. One of these tools is SQL*Plus, which is an interactive fourth-generation interface with the SQL layer. Any SQL command may be started from SQL*Plus. It makes it possible in particular to parametrize the working environment (length of a line per pages—number of lines per page, etc.) and formatting the results of the SQL queries on the screen or on paper. Another tool is SQL*DBA, oriented toward administration of the data base.

For good comprehension of the present invention, the major operations of Oracle will be recalled very briefly:

INDEX: makes access to an index. This operation can appear alone or followed by a TABLE ACCESS operation, depending on whether the values in the index are used directly or serve to select tuples from the table.

NESTED LOOPS: for each tuple originating from the first son, the cartesian product with the tuples originating in the second son is taken.

TABLE ACCESS: makes access to a table and is capable of making restrictions.

The conventional method for helping and optimizing a query of an RDBMS includes searching for a plan of execution of the query written in the query language of the RDBMS. FIG. 2C, in a window on a screen, shows an example of a query 10 written in the query language SQL of Oracle. In Oracle, the search for the plan of execution of the query 10 can be made by using the tool SQL*Plus or SQL*DBA. The query 10 is written, and in response the tool constructs a table representing the plan selected by the core of RDBMS in order to execute the query. This table must be created beforehand by the user and may be consulted by the SQL selection commands.

FIG. 1 shows a very brief example, for the sake of convenience, of a table 11 obtained by printout page by page of the corresponding table that has been created by the RDBMS upon the request of the user. The table 11 is composed of two pages, each repeating the headings of seven representative columns, which in succession are operations (OPERATION), options (OPTION), the owner of the object (OBJECT_OWNER), the name of the object (OBJECT_NAME), and for each operation, its number (ID), the number of the preceding operation (PARE) and its position (POSI) if the operation has sister operations. The simple query 10 illustrated in FIG. 2C provides some idea of a table relating to an ordinary query and is a good illustration of the serious problem the user is presented with in optimizing the execution of the query. In practice, only if the administrator is a skilled user can he interpret this table. It will also be understood that even for the administrator, interpreting the table is as a rule generally time-consuming and difficult. Moreover, in this way he has no global overview whatever of the execution plan. The invention presents a solution that makes it unnecessary to consult a person with highly sophisticated knowledge of the administration of an RDBMS.

In one characteristic of the invention, a searching tool called DB*EXPLAIN has been created in order first to propose to the user that the table representing the execution plan of a query be created automatically. In an accessory advantage of this tool, the administrator does not have to write a query in the SQL language.

Figure 2B:
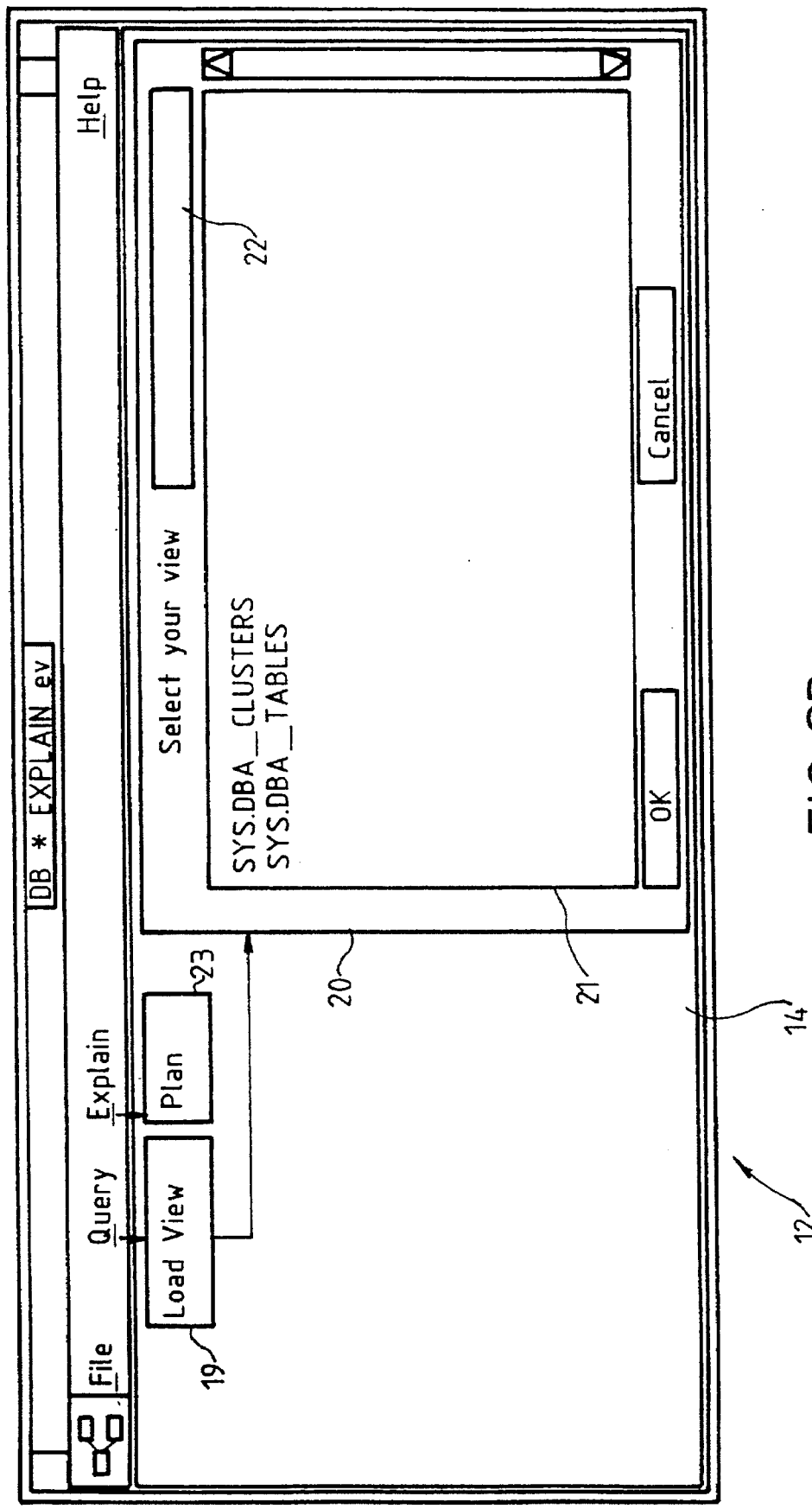

FIGS. 2A, 2B and 2C by way of example illustrate a log-on screen 12 of the tool DB*EXPLAIN. This example has been created using the OSF/Motif software, this being a trademark registered by Open Software Foundation, Inc. in the United States. The screen 12 contains a menu bar 13 and a dialog window 14. The menu bar 13 includes three main menus, File, Query and Explain. The File menu 15 is represented by FIG. 2A and pertains to the queries obtained in the files. It presents four options, Open, Save, Save As, and Exit. By clicking on the Open option, a selection window 16 appears in the dialog window 14. The selection window 16 in standardized fashion incorporates a scrolling list 17 of current files (F1, F2, etc.) containing queries, and a box 18 making it possible to write the name of a file to be selected. By clicking on the Save option, of the File menu 15, the file desired is saved under the name it already has. By clicking on the Save As option, the file desired is saved under the name chosen and written by the user. Finally, one clicks on the Exit option to exit from DB*EXPLAIN.

FIG. 2B by way of example illustrates the query menu 19 in the log-on screen 12. It incorporates only a Load View option serving to open a selection window 20 that incorporates a scrolling list 21 of the views contained in the dictionary of the RDBMS as another source of queries (in the example shown, these views are SYS.DBA_CLUSTERS and SYS.DBA_TABLES) and a box 22 making it possible to write the name of a desired view. FIG. 2B also shows the explain menu 23, which incorporates only the Plan option. By clicking on this option, the tool DB*EXPLAIN constructs a representative table of the plan of execution of the query, advantageously in the same way as the tools SQL*Plus and SQL*DBA. Clearly, it would be possible to adapt the tool DB*EXPLAIN so that it can represent this table in an editing window, in the same manner as the table 11 shown in FIG. 1. However, the method of the invention adapted to the example shown has need of only the table in order to furnish a representation of the execution plan that is clearly better than the table 11 shown, so that in practice this representation is superfluous.

FIG. 2C illustrates an editing window 24 produced in the dialog window 14 in order to represent a query originating from a selected file among the scrolling list 17 or defined in the box 18 of the screen illustrated in FIG. 2B, or of the view selected in the scrolling list 21 or defined in the box 22 of FIG. 2B. FIG. 2C, in the editing window 24, shows the query 10 which is presented by way of example as having selected the view SYS.DBA_CLUSTERS in the list 21 of FIG. 2B. This view pertains to the clusters of the data base and belongs to the SYS administrator. Because of the tool DB*EXPLAIN, there is no longer any need to write an already available query. Thus this tool has the major advantage of making it unnecessary to design and rewrite the query and avoiding all the attendant risks of mistakes and lost time. Another advantage is the capability of directly and easily modifying the contents of the query that appears in the editing window 24, thanks to the use, in the embodiment chosen as a preferred example, of the OSF/Motif software.

Figure 3:
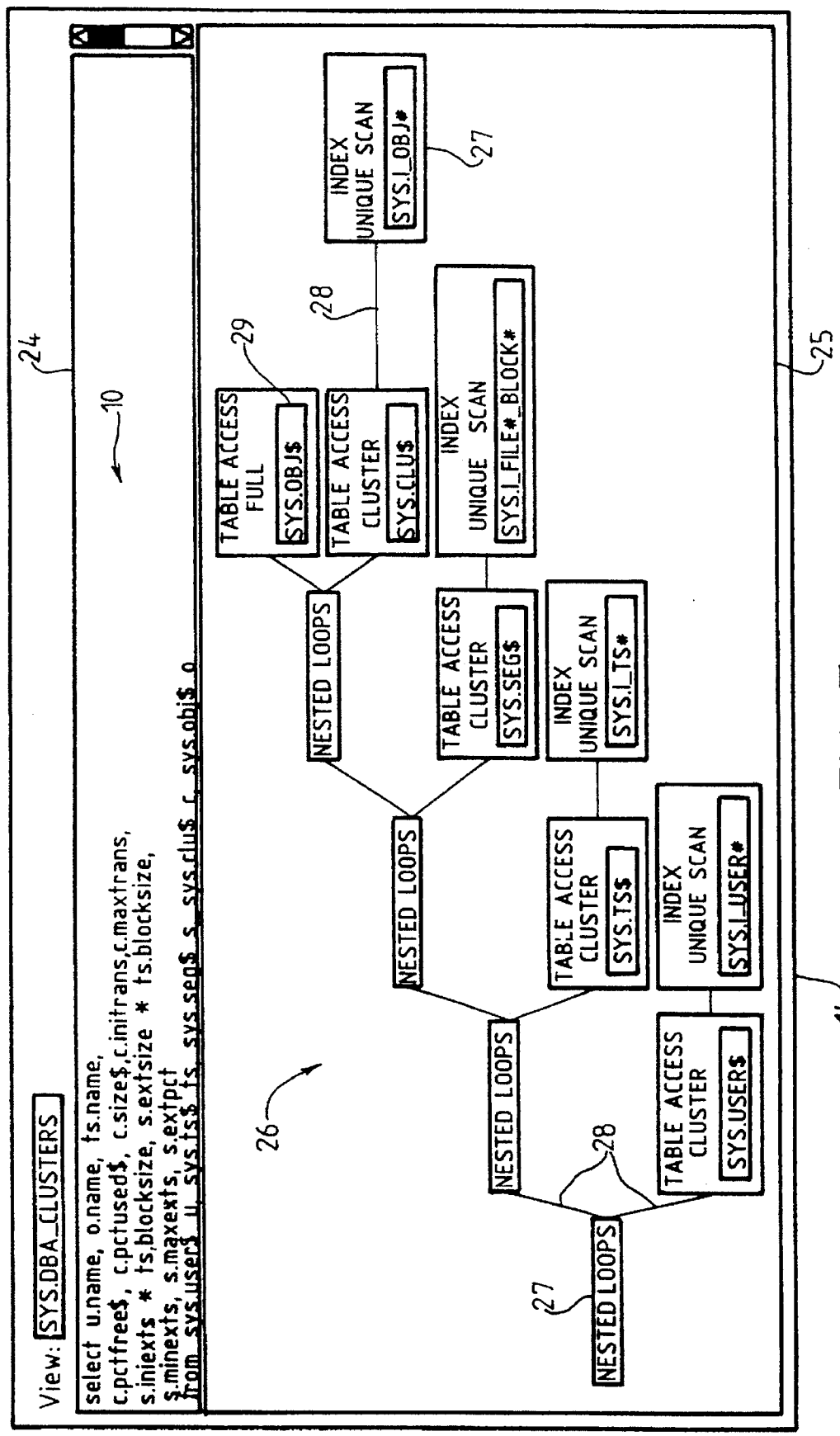
FIG. 3 illustrates an example of a tree for executing the query shown in FIG. 2C, obtained by employing the method of the invention to help in optimizing the query.

The invention consists of constructing an execution tree of the query, based on the execution plan of the query 10, and representing the tree on a screen. In the screen shown in FIG. 3, a window 25 contains a tree 26 representing the execution of the query 10. The tree 26 is made of boxes 27 connected to one another by links 28. The construction of the links 28 of the tree 26 has been done by analysis of the results of the request for the plan of execution in the query written in the query language of the RDBMS, this result being the table 11 for the RDBMS chosen by way of example. The analysis of the query 10 has advantageously been done in practice by structures in C language, which point to affiliated structures in order to construct a purely software graph. In a very simple example that is sufficient on its own for employing the method of the invention, the structure associated with each of the nodes constituted by the boxes 27 of the tree 26 may be produced simply on the basis of the table produced by Explain Plan in the following formula:

```
typedef struct node_{
    int         type;
    char        operation [30];
    char        options [30];
    char        object_name [30];
    char        object_owner [30];
    int         id;
    int         parent_id;
    int         position;
    struct node_    * brother;
    struct node_    * child;
} Node;
```

Each time a tuple is rendered, one of the boxes 27 is created in the conventional manner, which is easy for one skilled in the art, for example using a graphical library function of the OSF/Motif software. In summary, in the tree 26 shown, the boxes 27 and their links 28 have been created by analysis of the query 10 in the table 11 that represents the execution plan. In the example shown in FIG. 3, the window 25 for showing the tree 26 is advantageously furnished by the tool DB*EXPLAIN under the Plan option and is accompanied by the name of the view and by the window 24 for editing the query 10 that have been shown in FIG. 2C.

The tree 26 may incorporate all or some of the information resulting in the search for the execution plan of the query written in the RDBMS query language, such as the information contained in table 11 of FIG. 1. For example, each box 27 has as a heading the name of the operation to which this box relates. Hence in FIG. 3 the names NESTED LOOPS, TABLE ACCESS and INDEX, which are shown in the OPERATION column of table 11 in FIG. 1, are seen. If the operation constituting the heading of a box 27 has an option being executed for a given object, then the name of this option may be mentioned in the box, advantageously as a subheading. Similarly, if the operation mentioned in the heading in a box 27 has characteristics such as the name of the object and the name of the owner of the object to which the operation option applies, all or some of these characteristics may be indicated in the box. All of these advantageous options of the invention are contained in the tree 26 shown in FIG. 3. Thus in the thirteen boxes 27 of the tree 26, the names of the thirteen operations mentioned in table 11 are found, supplemented with the possible option that is executed for a given object, the name of the object, and the name of the owner of the object. The tree 26 affords the advantage of being easily understood by any user, regardless of his skill in the query language of the RDBMS, and of furnishing him a global overview of the execution plan of the query. The user seeing the tree 26 can thus more easily and quickly decide on what action to take to optimize the query that has been made. On the other hand, thanks to the tool DB*EXPLAIN, it has been seen that the user need not write the query and can easily modify it in the editing window 24 of FIG. 2C. After modification, the administrator can have the new execution tree very quickly, in order to find out how effective his modification is. The tool affords the additional advantage of saving the preceding tree and thus enables the administrator to compare the two trees easily and quickly.

Naturally, these advantages may also be afforded without using the tool DB*EXPLAIN, and by using the conventional means for searching for the execution plan of a query in the query language of the RDBMS. The results of this search are shown in a table 11 in the RDBMS chosen by way of example, but it will be appreciated that they may be present in some other form, depending on the type of RDBMS. The analysis of these results will be easily adapted to their form by one skilled in the art in order to create an execution tree for the query.

In another characteristic of the invention, other information besides that furnished by the analysis of the results of the request for the execution plan may be obtained. For example, it is possible to obtain additional information about certain possible characteristics of an operation. In the example shown, the name of the object on which the operation is executed, constituting the heading of a box 27 and optionally the owner of this object, are written in a button 29 inserted in the box, in such a way that by clicking on the button 29, a user can obtain additional information about this object.

In the case where the operation that is executed on the object clicked on is a table (TABLE ACCESS in the boxes 27 in the example shown), the search for the additional information is made for example by means of an SQL request in the DBA_TAB_COLUMNS table of the Oracle dictionary. This table shows the structure of a table contained in the data base of the RDBMS, that is, the name of the columns and in particular with their types and sizes. The additional information can thus be all or some of the descriptive elements of the table mentioned in the box. It is accordingly possible to obtain the description of the table, for example, the name of the columns, and the type of the columns. By preference, the tool DB*EXPLAIN displays them in an appended window, not shown.

Figure 4A:
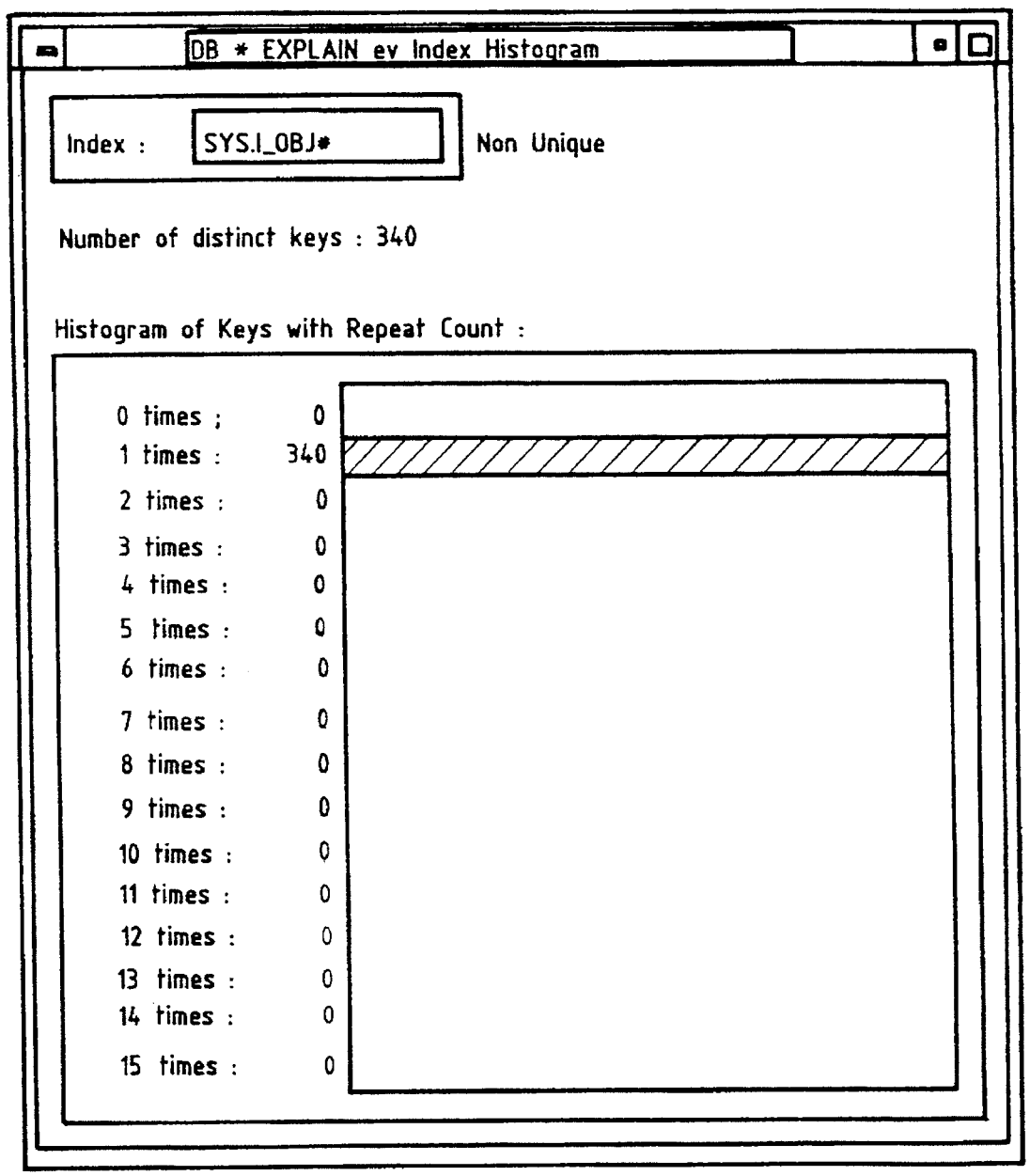
FIGS. 4A, 4B and 4C show histograms than can be obtained by employing the method of the invention.

If the operation being executed on the object clicked on is an index (INDEX in the boxes 27), then the additional information may be a histogram, like that shown in FIG. 4A. The information contained in this histogram has been obtained by the Oracle command VALIDATE INDEX. In response, Oracle creates a histogram table. On the basis of this histogram table and by means of a small program that is ordinary to one skilled in the art, a screen representing this histogram, like that shown in FIG. 4A, is formed.

Figure 4B:
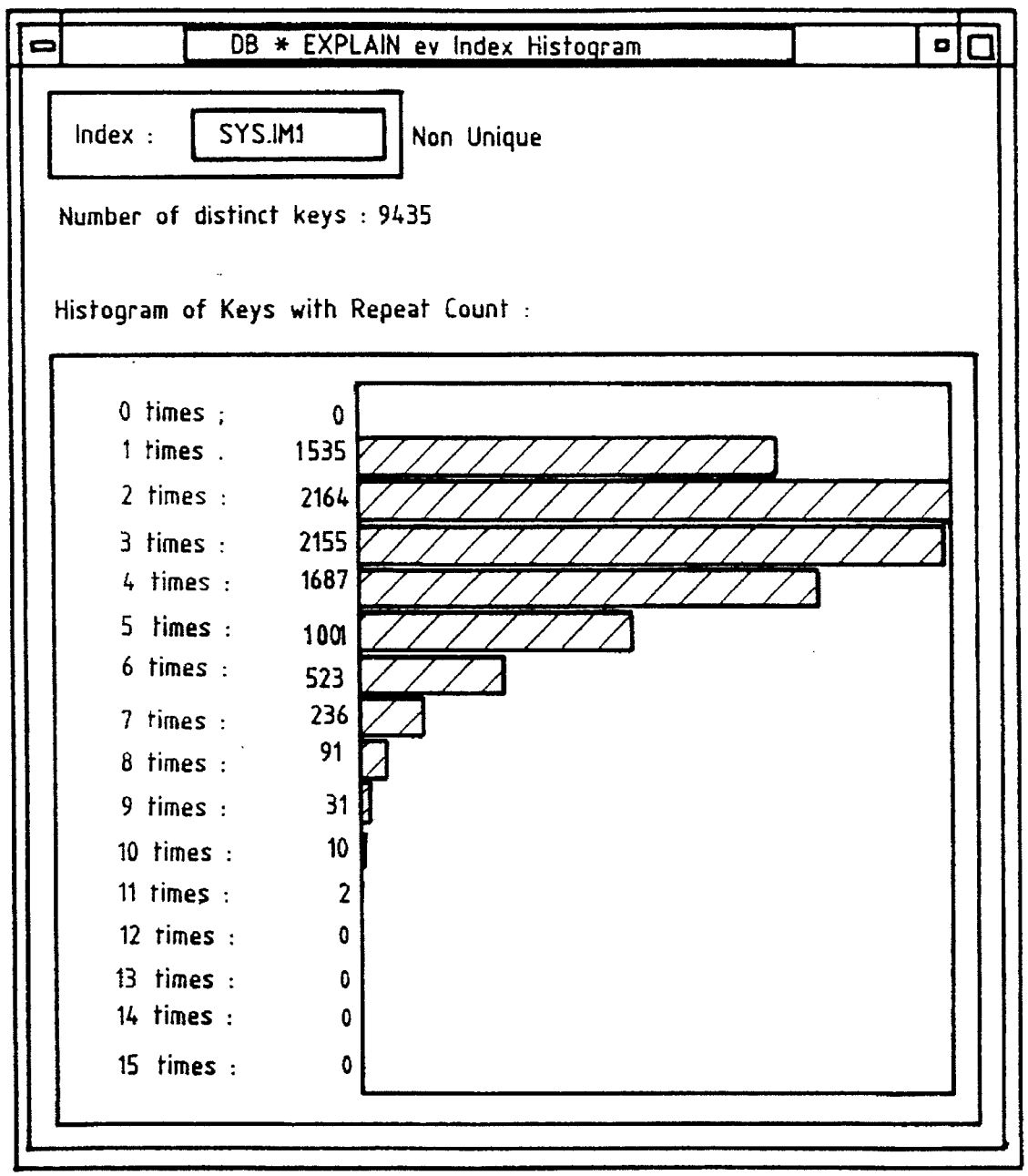
Figure 4C:
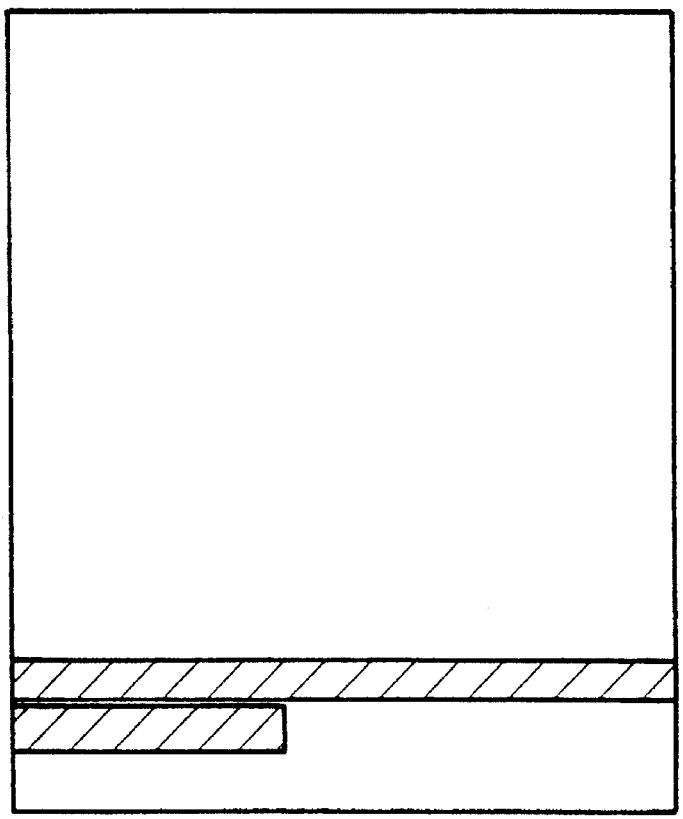

In the example shown in FIG. 4A, the user knows that his index includes 340 keys that are not repeated. The user immediately knows that the index chosen is very good. FIGS. 4B and 4C, respectively, show two other examples of histograms that may be obtained thanks to the invention. In the example of FIG. 4B, the user knows that the indexes used are less selective than before. FIG. 4C is a histogram representing a very unselective index which accordingly is to be changed. These examples highlight the advantages afforded by the method of the invention.

While this invention has been described in conjunction with specific embodiments thereof, it is evident that many alternatives, modifications and variations will be apparent to those skilled in the art. Accordingly, the preferred embodiments of the invention, as set forth herein, are intended to be illustrative, not limiting. Various changes may be made without departing from the true spirit and full scope of the invention, as defined in the following claims.

I claim:

1. A method for displaying a query execution plan of a query for a relational database management system (RDBMS), said RDBMS being of the type that processes aspatial data only and having a screen display, said query execution plan comprising operations to be executed by said RDBMS, said operations being interconnected through links, said method comprising the steps of:

generating information representative of said query execution plan, said information including at least one of operation names for said operations of the query execution plan, an option, and at least one characteristic of each said operation;

analyzing said information to determine said operation names, said options, said characteristics and said links; and displaying on said screen display the operations in respective boxes, each of said boxes incorporating said operation name and corresponding options and characteristics, and the links between said boxes in a linear graphical form.

2. The method of claim 1, wherein said information is arranged in a table.

3. The method of claim 1, wherein the RDBMS has objects and said characteristic is associated with one of said objects.

4. The method of claim 1, wherein said characteristic in said box includes information, said method further comprising:

incorporating said characteristic in a button within said box; and clicking on said button to display said information on said screen display.

5. The method of claim 4, wherein said box incorporating said characteristic includes a table having descriptive elements, and said information includes said descriptive elements.

6. The method of claim 4, wherein said box incorporating said characteristic is an index, and said related information includes a histogram.

7. The method of claim 1, wherein the RDBMS has a dictionary including views, each view comprising a query, and said step of generating, further comprises:

selecting the query from said views of said dictionary; and displaying the query of said selected view on the screen display.

8. The method of claim 7, further comprising:

displaying the query on the screen display; and modifying contents of the query so that the query execution plan can be optimized by a user.

9. The method of claim 1, wherein the query is stored in a file, and said step of generating, further comprises:

displaying the query of said file on the screen display.

10. The method of claim 9, further comprising:

displaying the query on the screen display; and modifying contents of the query so that the query execution plan can be optimized by a user.

11. The method of claim 1, further comprising:

displaying the query on the screen display; and modifying contents of the query so that the query execution plan can be optimized by a user.

12. A tool for displaying a query execution plan of a query for a relational database management system (RDBMS), said RDBMS being of the type that processes aspatial data only and having a screen display, wherein the query execution plan comprises operations to be executed by the RDBMS, the operations being interconnected through links, said tool comprising:

an input for receiving information representative of the query execution plan, said information including at least one of operation names for the operations of the query execution plan, an option and at least one characteristic of each of the operations;

said tool having means for analyzing said information to determine said operation names, said options, said characteristics and said links; and means for displaying on the screen display the operations in respective boxes, each box incorporating said operation name and corresponding option and characteristics and the links between the boxes in linear graphical form.

13. The tool of claim 12, wherein said information is arranged in a table.

14. The tool of claim 12, wherein the RDBMS has objects and said characteristic is associated with one of said objects.

15. The tool of claim 12, wherein said characteristic in said box includes information, said tool having means for incorporating said characteristic in a button within said box; and said tool having means for providing a user with the ability to click on said button to display said information on said screen display.

16. The tool of claim 15, wherein said box incorporating said characteristic includes a table having descriptive elements, and said information includes said descriptive elements.

17. The tool of claim 15, wherein said box incorporating said characteristic is an index, and said information includes a histogram.

18. The tool of claim 12, wherein the RDBMS has a dictionary including views, each view comprising a query, said tool including means for selecting the query from said views of said dictionary, and means for displaying the query of said selected view on the screen display.

19. The tool of claim 18, wherein said tool displays the query on the screen display, and modifies contents of the query so that the query execution plan can be optimized by a user.

20. The tool of claim 12, wherein the query is stored in a file, and said tool displays the query of said file on the screen display.

21. The tool of claim 20, wherein said tool displays the query on the screen display, and modifies contents of the query so that the query execution plan can be optimized by a user.

22. The tool of claim 12, wherein said tool displays the query on the screen display, and modifies contents of the query so that the query execution plan can be optimized by a user.

* * * * *